A. M. LAYCOCK.
SPRING.
APPLICATION FILED NOV. 5, 1915.
1,278,948.
Patented Sept. 17, 1918.
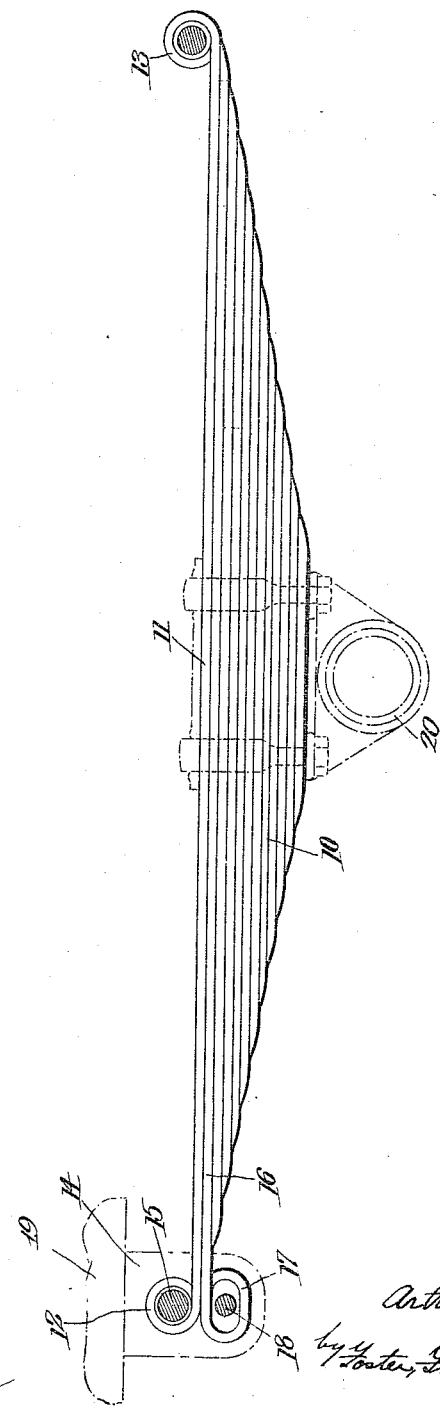
Witnesses
G. T. Baker
H. P. Jennings
Inventor
Arthur M. Laycock
by Foster, Freeman, Watson & Coit
Attorneys

UNITED STATES PATENT OFFICE.

ARTHUR M. LAYCOCK, OF KINGSTON, PENNSYLVANIA.

SPRING.

1,278,948. Specification of Letters Patent. Patented Sept. 17, 1918.

Application filed November 5, 1915. Serial No. 59,858.

*To all whom it may concern:*

Be it known that I, ARTHUR M. LAYCOCK, a subject of the King of Great Britain, and resident of Kingston, county of Luzerne, State of Pennsylvania, have invented certain new and useful Improvements in Springs, of which the following is a specification.

This invention relates to vehicle springs and more particularly to springs of the semi-elliptic type comprising a plurality of superposed leaves.

It is the object of the invention to provide a spring of the above mentioned type which shall be provided at its ends with means adapted to form an emergency connection with a supporting member when the normal connection is broken.

Other objects and the features of novelty will be apparent from the following description taken in connection with the accompanying drawing which is a side elevation of a spring embodying my invention.

Referring to the drawing it will be seen that the spring comprises a plurality of superposed leaves 10, one of which, indicated by the numeral 11, is provided with eyes 12 and 13 at its opposite ends, whereby the leaf may be connected with suitable supporting means, one of which is shown at 14 in broken lines in connection with the eye 12. The eyes 12 and 13 constitute the usual connection between the spring and the supporting members with which it is associated and as illustrated a pintle 15 connects the eye 12 with the supporting member 14. The supporting means 14 may be connected to or form part of the frame of a vehicle as illustrated in dotted lines at 19. The spring 10 may be connected with the axle 20 in any desired manner. The construction thus far described is that ordinarily employed and it will be evident from the drawing that in case of fracture of the leaf 11 or the pintle 15 the connection between the spring and the supporting member 14 would be broken and might lead to serious consequences, especially in case of a motor vehicle where the drive or forward thrust is transmitted from the driving axle to the body through the form of connection illustrated.

In order to provide for an emergency connection between the spring and the supporting member a leaf 16, and preferably the one adjoining the leaf 11, has a loop or eye 17 formed in the end adjacent the eye 12, the loop 17 being turned in the opposite direction from the eye 12. Another pintle 18 is carried by the supporting member 14 and passes through the loop 17 but is preferably out of contact with the loop at all times except when the connection through the eye 12 is broken. In case of a fracture of the leaf 11 or of the pintle 15, the connection between the spring and the supporting member would be formed through the pintle 18, this being purely an emergency connection provided for the purpose of preventing the serious consequences which might otherwise arise from a breaking of the connection through the eye 12.

Having described the invention what is claimed and desired to be secured by Letters-Patent is, 1. The combination of a supporting member, a spring having a plurality of leaves, one of which is formed with an eye, a pintle connecting said eye with said supporting member, another pintle on said supporting member, and another of said leaves having an end formed with an eye larger than the last-mentioned pintle adapted to receive said pintle therein with the pintle out of contact with the eye.

2. The combination of a vehicle frame, a spring, connecting means comprising a pintle on the frame coöperating with the spring, an auxiliary connecting means including a second pintle on the frame normally out of contact with the spring constructed and arranged to become operative when the first mentioned means becomes inoperative.

3. The combination with a vehicle frame and axle, of a spring comprising a main plate and one or more auxiliary plates, means connecting the spring to the axle, and means connecting an end of the spring to the frame, the last mentioned connecting means comprising an eye on the main plate and an eye on the auxiliary plate adjacent thereto, one of such eyes being elongated, and pins extending through said eyes, both of said pins being carried by the frame.

4. The combination with a vehicle frame and axle, of a spring, a pintle normally connecting the spring and frame, and means normally out of contact with the spring constructed and arranged to become operative to connect the spring and frame if the said pintle should fail.

In testimony whereof I affix my signature.

ARTHUR M. LAYCOCK.

Copies of this patent may be obtained for five cents each, by addressing the "Commissioner of Patents, Washington, D. C."